(No Model.) 2 Sheets—Sheet 1.

W. H. HART, Jr.
RETAINING PIN FOR NECK WEAR.

No. 342,355. Patented May 25, 1886.

Witnesses.
H. F. Parker
Joseph Williams

Inventor.
William H. Hart Jr.
by C. Hyphys Butts
Attorney (No Model.) 2 Sheets—Sheet 2.

W. H. HART, Jr.

RETAINING PIN FOR NECK WEAR.

No. 342,355. Patented May 25, 1886.

Witnesses.
H. F. Parker.
Joseph Learmin.

Inventor.
William H. Hart Jr.
by C. Wyllys Betts
Attorney

UNITED STATES PATENT OFFICE.

WILLIAM H. HART, JR., OF PHILADELPHIA, PENNSYLVANIA.

RETAINING-PIN FOR NECK-WEAR.

SPECIFICATION forming part of Letters Patent No. 342,355, dated May 25, 1886.

Application filed January 19, 1885. Serial No. 153,311. (No model.)

*To all whom it may concern:*

Be it known that I, WILLIAM H. HART, Jr., a citizen of the United States, residing at Philadelphia, in the State of Pennsylvania, have invented a new and useful Improvement in Retaining-Pins for Neck-Wear, of which the following is a specification.

My invention relates to the attachment of a plain pin to a scarf-shield without the aid of anything but bends in the pin itself passing through holes in the shield, and it is an improvement upon the neck-wear pins for which Letters Patent of the United States were granted to me and Joseph C. Gaither, October 14, 1879, No. 220,610.

The object of my invention is to provide a still better bearing for the pin when pressure is made upon its point.

In the pin described in the said Letters Patent No. 220,610 the "clamping end" provided absolutely against the pin being moved in the direction of its point; but it sometimes happens that these pins when used in a shield of thin material will be pushed out of place by pressure on the point by reason of the bending of the material at the points where the shoulders pass through it, and because the clamping end is bent toward the point of the pin in said patent, and thus when pressure is brought upon the point of the pin the tendency of the card is to move out of the bight or crotch formed by the upper bend of the pin.

My present improvement is to form a jaw or crotch in the body of the pin, the opening of which is turned so far away from the point that pressure upon the point will force the card-board against the closed end of said crotch or bight, while the clamping ends, forming the sides of said jaw or crotch, prevent the pin from moving toward its point. By this means the pin is much more secure, and is prevented absolutely from slipping upward toward the center of the shield. I attain this object by the structure illustrated in the accompanying drawings, in which—

Figure 1:
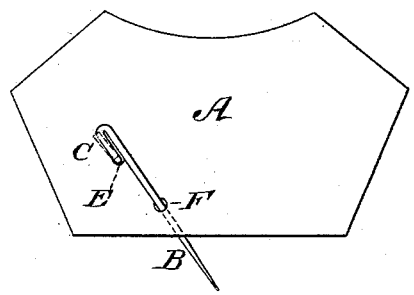
Figure 2:
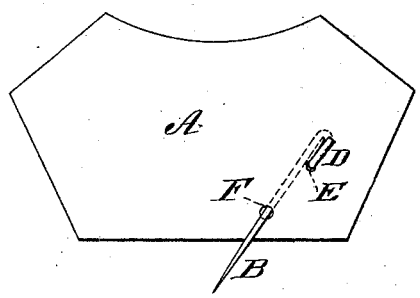
Figure 3:
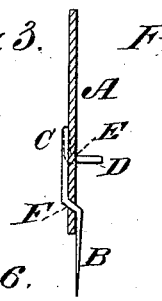
Figure 4:
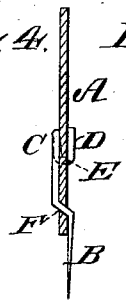
Figure 5:
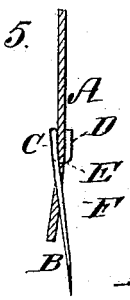

Figures 1 and 2 are views of opposite faces of a neckscarf-shield having my invention applied to it. Fig. 3 is a section in the line *x x*, Fig. 2, showing the pin in position prior to clamping. Fig. 4 shows in section the pin clamped and secured to the shield, and Fig. 5 is a view in section of the same with the lower shoulder omitted. Figs. 6, 7, 8, and 9 are corresponding views of a modified form of the invention. Figs. 10, 11, 12, and 13 are corresponding views of a third modified form of the invention.

The pins shown in Figs. 6 to 13, in addition to the clamping end turned away from the point herein described and claimed, have a second clamping end turned toward the point, as shown in said Letters Patent No. 220,610. This a mere addition and is no part of my present invention.

Similar letters of reference indicate corresponding parts in the several figures.

A represent the shield, and B the pin.

Figure 10:
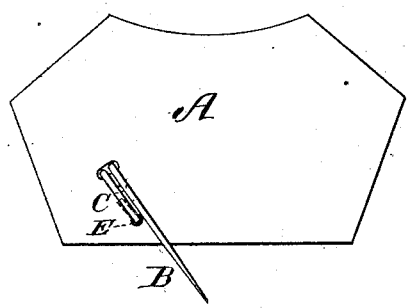
Figure 11:
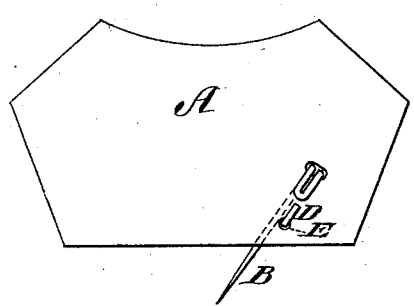
Figure 13:
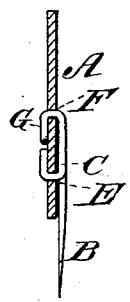

C and D represent the portions of the pin that clamp the shield between them and form the jaw or crotch at the point E, where it passes through the shield. The inner curve of this jaw or crotch receives the force of any pressure upon the point of the pin. At the point F, Figs. 3 and 4, is a shoulder which I prefer to use in order that the pin may lie more closely to the shield; but it may be omitted, as shown in Figs. 5, 10, 13. It does not form an essential element of my present invention, being fully described in Patent No. 220,610.

In Figs. 1, 2, 4, 5, 10, 11, and 13 the portions C and D, which form the clamping ends, are turned directly away from the point of the pin B, so as to form the jaw or crotch E between them, and thus the pin cannot move toward the center of the shield without tearing the shield.

Figure 6:
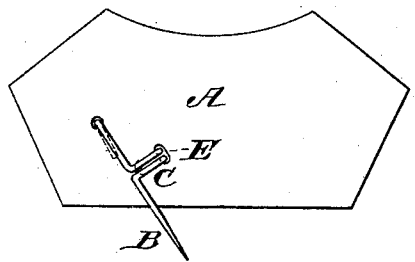
Figure 7:
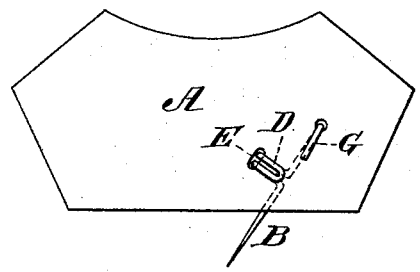
Figure 9:

In Figs. 6, 7, 9 the portions C D, which form the clamping ends, are turned at right angles to the line of the pin B. This form differs from the other in that the strain when pressure is made upon the point is not in the line of the pin, but the pin is in like manner absolutely prevented from slipping by the jaw or crotch E pressing upon the shield.

Figure 8:
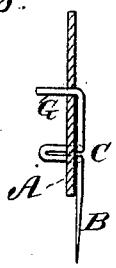
Figure 12:
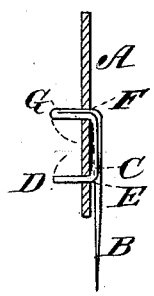

The pins are attached in the following manner: Where the pin has only a single clamping end, as shown in Figs. 1, 2, 4, and 5, two openings are made in the shield at E and F, and the pointed end of the pin is inserted in the lower opening, F, until the clamping end D, bent at right angles to the pin, is opposite the upper perforation. The said clamping end D is then passed through the upper perforation, so that it appears on the same side of the shield as the pointed end of the pin, as shown in Fig. 3, after which it is bent down against the shield in the direction of the opposite clamping portion, C, and thus the shield is firmly clamped between C and D, as shown in Figs. 4 and 5. Where the pin has two clamping ends, as shown in Figs. 6 to 13, these ends are first thrust through the apertures in the shields, as shown at Figs. 8 and 12, and then bent down upon the shield, as shown at Figs. 9 and 13.

All the foregoing forms have the features in common which is the essence of my present invention—namely, that the pin is so bent that pressure at its point is effectually resisted by the shield being forced into and against the closed end of the jaw or crotch formed by a bend of the body-pin, while at the same time the pin cannot be pulled out of the shield because the clamping ends C and D, which form this jaw or crotch between them, resist such movement.

The best form of my invention is that shown in Figs. 1, 2, 5, in which the clamping portions and the opening of the crotch are turned directly away from the point; but intermediate angles may be used, as shown in Figs. 6 and 7. It will be observed that in no case the clamping ends lie between the point of the pin and the crotch formed between them.

My pin differs from the forms of pin shown in the patent to myself and J. C. Gaither, dated October 14, 1879, No. 220,610, and to Smith and Thayer, dated April 23, 1878, No. 202,673—namely, that in the first of these patents, No. 220,610, the shoulder which resists pressure at the upper end of the pin is above the place where the clamping action is effected, and hence bending the material of the shield may possibly allow the shoulder to slip to one side of the perforation in the material, and in the latter patent, No. 202,673, the pin has a bend which does not bring any portion of the body of the pin opposite another portion, and thus no crotch or bight is anywhere formed.

Pins may be bent into a number of other forms more or less complicated, so as to contain the crotch opening away from the point, which is the novel feature of my invention.

What I claim, and desire to secure by Letters Patent, is—

1. A retaining-pin for a scarf-shield, formed of wire or other continuous piece of metal, said pin having the point projecting beyond the edge of the shield and the body of the pin being bent so as to form a crotch or jaw opening away from the direction of the point of the pin, and adapted to inclose a portion of the shield between the sides of said jaw, and the body of the pin adjacent to and on each side of said jaw being adapted to be clamped upon and grip the shield on its opposite sides, substantially as described.

2. In combination, a retaining-pin formed of wire or other continuous piece of metal, and a scarf-shield, said pin having the point projecting beyond the edge of the shield and the body of the pin bent to form a crotch or jaw opening away from the direction of the bend, a portion of the shield being inclosed in said jaw, and the body of the pin adjacent to and on each side of said jaw being clamped upon and gripping the shield, substantially as described.

3. A neckscarf-shield having a pin constructed of a piece of wire bent as at E F, forming the right-lined parts C D B, substantially as and for the purpose set forth.

4. A neckscarf-shield formed with openings at E F, in combination with a pin connected therewith, formed of the parts C D B and bends E F, the latter being respectively at the upper and lower parts of the pin, substantially as and for the purpose set forth.

WILLIAM H. HART, JR.

In presence of—
JOS. F. HENRY,
CHS. B. HART.